(12) United States Patent
Ward, Jr.

(10) Patent No.: US 7,493,809 B1
(45) Date of Patent: Feb. 24, 2009

(54) METHOD AND SYSTEM FOR MEASURING DEFORMATION IN TURBINE BLADES

(75) Inventor: John David Ward, Jr., Woodruff, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/867,619

(22) Filed: Oct. 4, 2007

(51) Int. Cl.
*G01M 19/00* (2006.01)
(52) U.S. Cl. .......................................................... 73/168
(58) Field of Classification Search ...................... 73/168
See application file for complete search history.

(56) References Cited

U.S. PATENT DOCUMENTS

| | | |
|---|---|---|
| 5,047,966 A | 9/1991 | Crow et al. |
| 5,238,366 A | 8/1993 | Ferleger |
| 5,625,958 A * | 5/1997 | DeCoursey et al. ............ 33/555 |
| 6,219,404 B1 * | 4/2001 | Thomson et al. ............... 378/72 |
| 6,568,254 B2 * | 5/2003 | Pross ....................... 73/112.01 |
| 6,983,659 B2 | 1/2006 | Soechting et al. |
| 7,162,373 B1 * | 1/2007 | Kadioglu et al. .............. 702/35 |

* cited by examiner

*Primary Examiner*—Max Noori
(74) *Attorney, Agent, or Firm*—Cantor Colburn LLP

(57) ABSTRACT

Disclosed is a method for measuring deformation of a turbine blade, the method including identifying at least one measuring point disposed on the turbine blade, retaining information pertaining to a first position of the at least one measuring point, operating the turbine blade over a period of time, measuring a spatial distance traveled by the at least one measuring point after the operating of the turbine blade over the period of time, the spatial distance being measured relative to the first position of the at least one measuring point; and determining an amount of deformation in the blade based on the measuring of the spatial distance.

16 Claims, 10 Drawing Sheets

METHOD AND SYSTEM FOR MEASURING DEFORMATION IN TURBINE BLADES

FIELD OF THE INVENTION

The disclosure relates generally to a method and system for measuring deformation of turbine blades, and more particularly to a method and system for measuring deformation of turbine blades over time.

BACKGROUND OF THE INVENTION

During usage, turbine blades are subjected to large accelerations. These accelerations can induce large stresses in regions of the turbine blade, which can induce permanent physical deformation in the geometric features of the turbine blade after operation of the turbine for some time interval. If allowed to continue unabated, the accumulation of deformation in the turbine blade can lead to blade failure including but not limited to gross blade failure through crack growth and rupture, or systemic failure such as disengagement of adjacent blade vibration dampening features. As such a system and or method for quantifying deformation in a turbine blade would be desirable.

BRIEF DESCRIPTION OF THE INVENTION

Disclosed is a method for measuring deformation of a turbine blade, the method including identifying at least one measuring point disposed on the turbine blade, retaining information pertaining to a first position of the at least one measuring point, operating the turbine blade over a period of time, measuring a spatial distance traveled by the at least one measuring point after the operating of the turbine blade over the period of time, the spatial distance being measured relative to the first position of the at least one measuring point; and determining an amount of deformation in the blade based on the measuring of the spatial distance.

Also disclosed is a system for measuring deformation of a turbine blade, the system including a computing resource configured to retain positional information pertaining to a first position of at least one measuring point disposed on the turbine, and a measurement device associated with the computing resource, the measurement device being configured to measure a distance traveled by the at least one measuring point relative to the first position.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
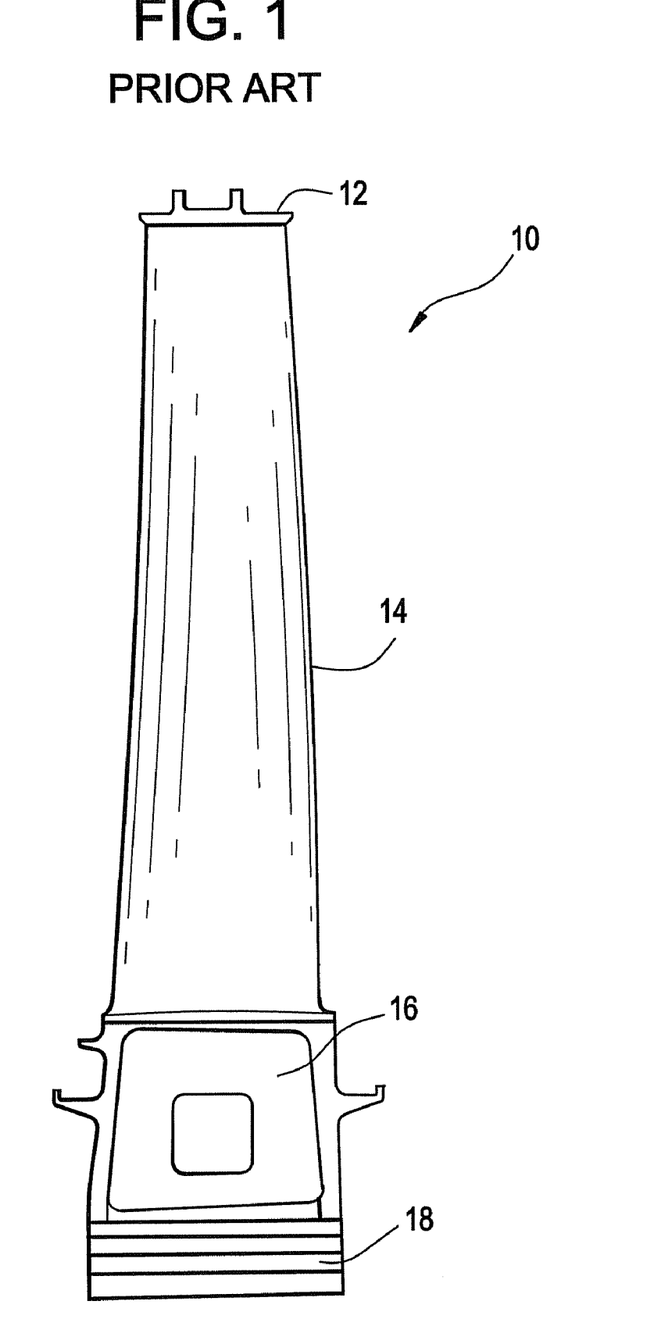
FIG. 1 is a side view of a turbine blade in accordance with the prior art.
Figure 2:
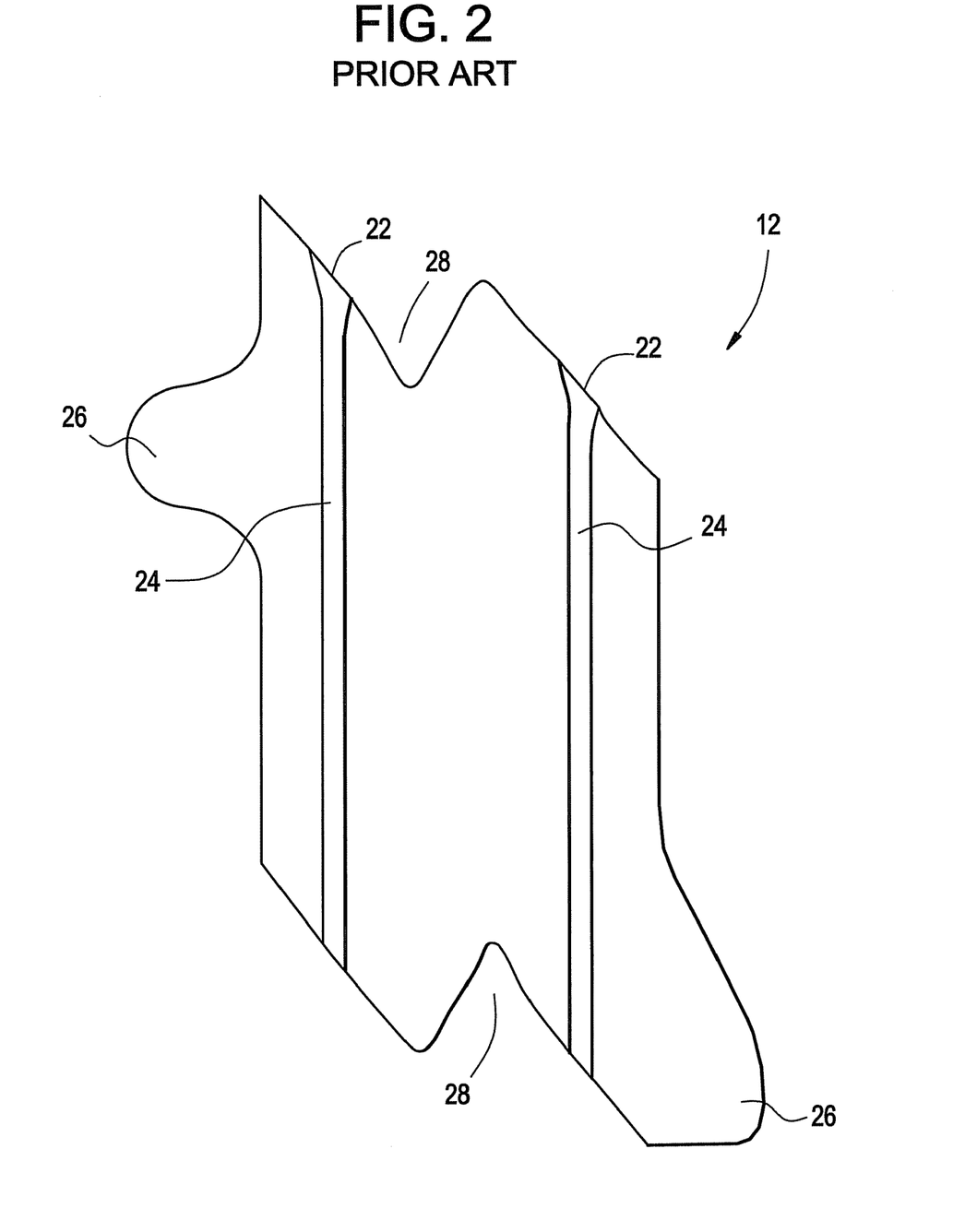
FIG. 2 is a top view of the turbine blade in accordance with the prior art.
Figure 3:
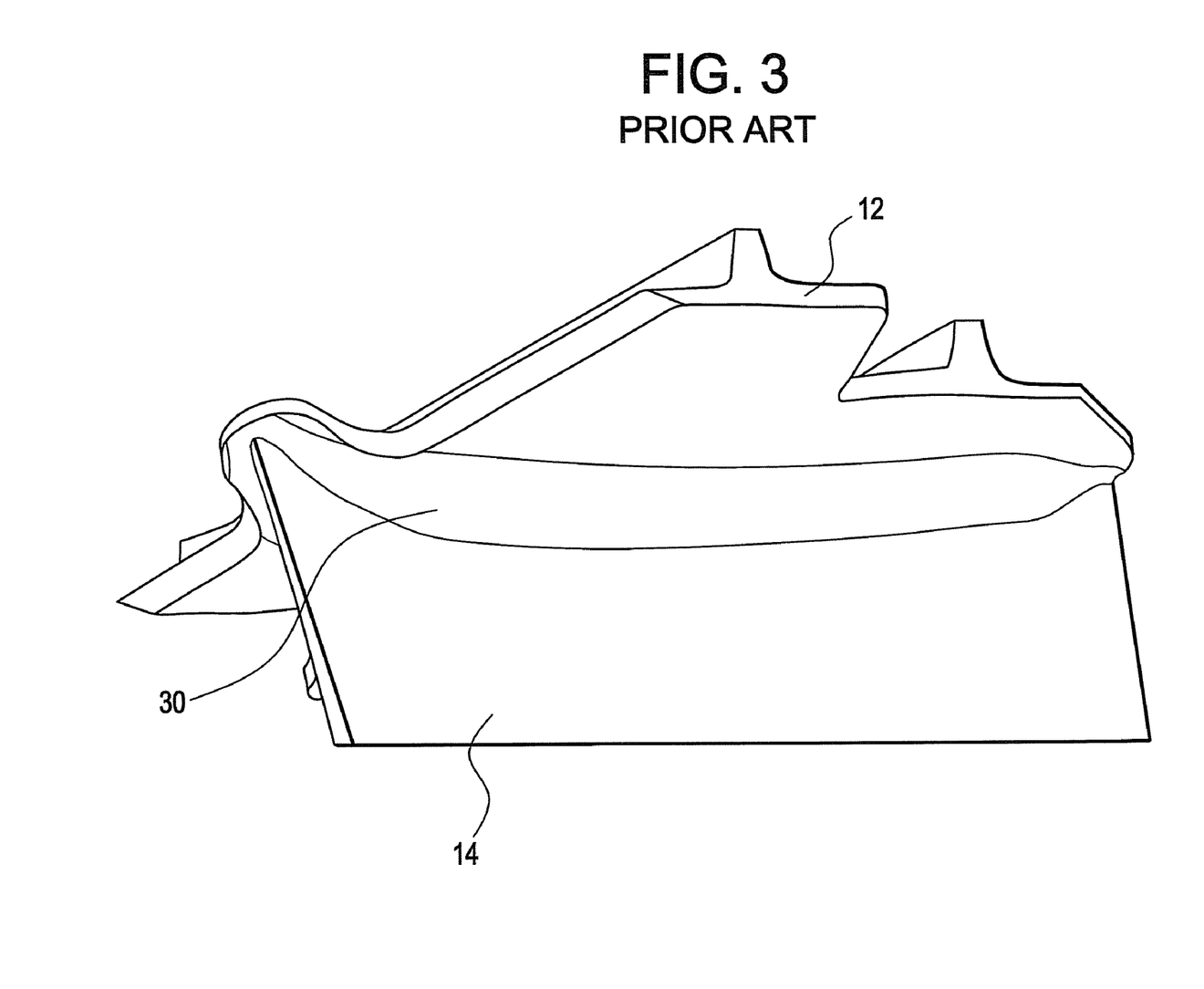
FIG. 3 is a perspective view of the turbine blade in accordance with the prior art.

Referring to FIGS. 1-3, a turbine blade 10 is illustrated. As is best shown in FIG. 1, the turbine blade 10 includes a tip shroud 12, an airfoil 14, a shank 16, and a dovetail 18. A system 20 for measuring deformation of this turbine blade 10 will be discussed below. In an exemplary embodiment of the system 20, deformation of the turbine blade 10 is particularly measured in the tip shroud 12 of the turbine blade 10. The particular portions to be measured for deformation include, but are not limited to, cutter teeth 22, rails 24, edges 26, z-notches 28, and airfoil junction regions (fillets) 30 of the tip shroud 12. The cutter teeth 22, rails 24, edges 26, z-notches 28, and airfoil junction regions 30 of the tip shroud 12 are best illustrated in FIGS. 2-4.

Figure 4:
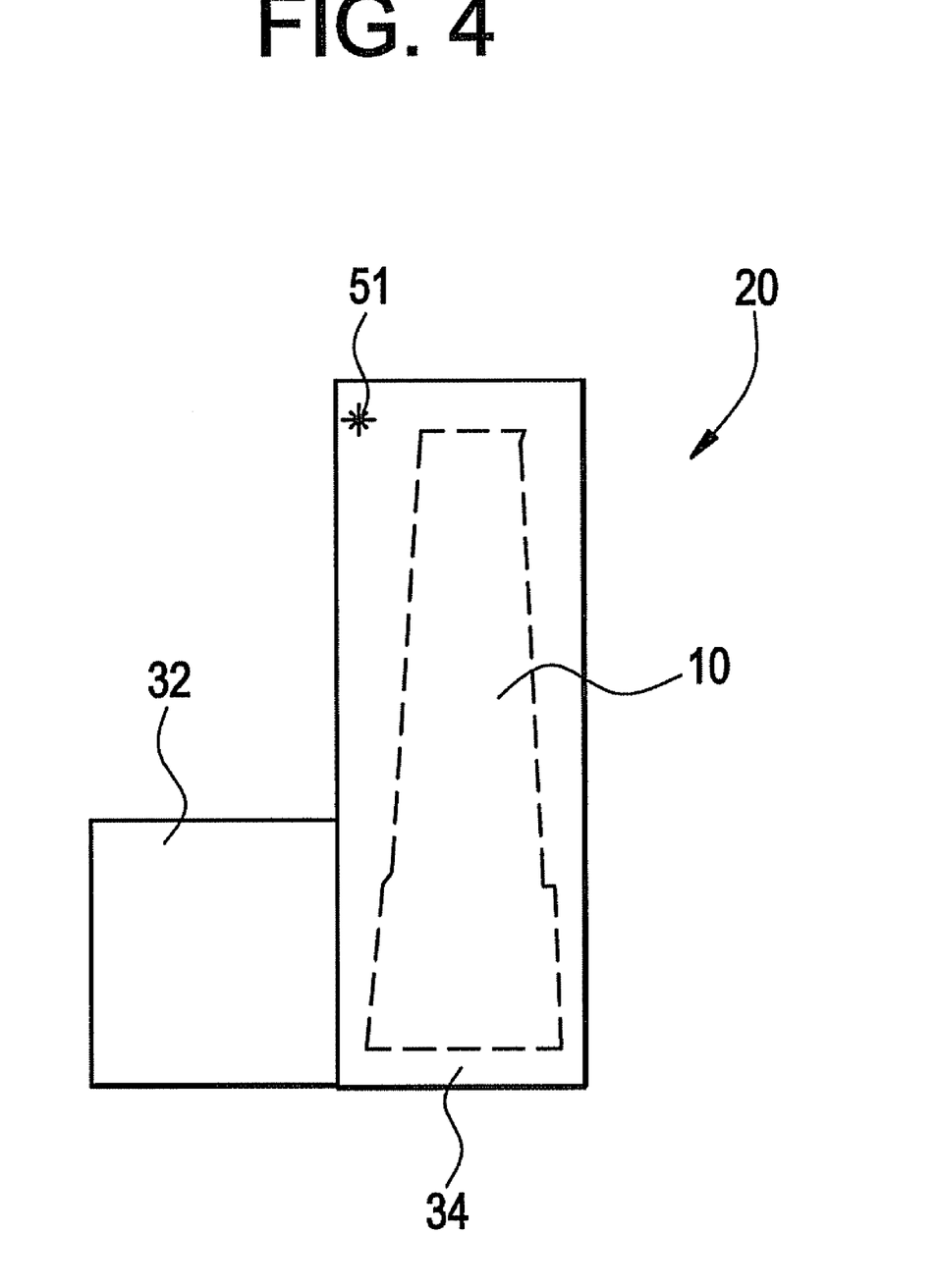
FIG. 4 is schematic view of a system for measuring deformation of a turbine blade.
Figure 5:
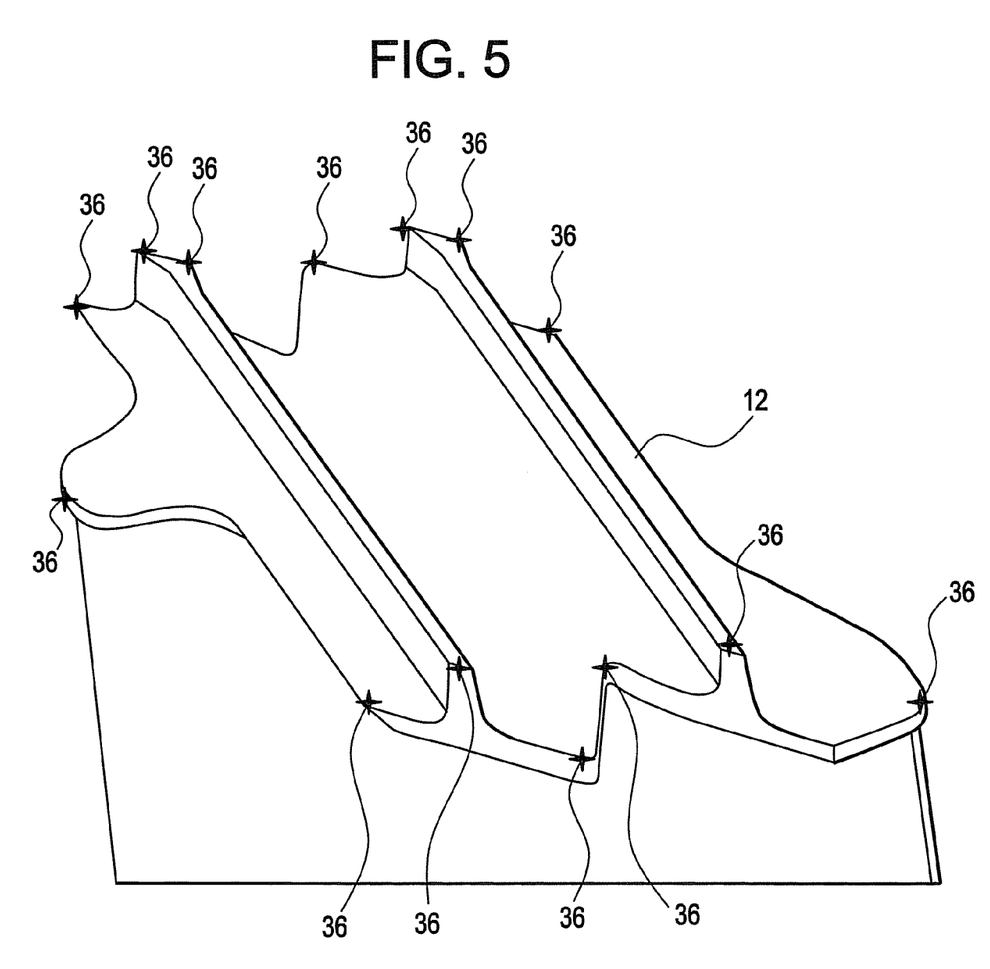
FIG. 5 is a partial schematic view of a portion of a turbine blade including measuring points for use with the system of FIG. 4.

Referring now to FIGS. 4-8, the system 20 is illustrated. As is best shown in FIG. 4, the system includes a computing resource 32 that is in association with, or part of, a measuring device 34. The computing resource 32 is configured to retain positional information pertaining to a first position 38 of at least one measuring point 36 that has been previously identified on the tip shroud 12 of the turbine 10 (see FIGS. 6-7). In the exemplary embodiment of FIG. 4, the blade 10 is show disposed within the measuring device 34 for measurements. However, though the blade 10 is shown in FIG. 4 to be measured while removed from association with a turbine, it should be appreciated that measurements may be taken while the blade is associated with the turbine.

The points on the turbine 10 that are identified as measuring points 36 may be identified as such at any time before or after manufacture of the blade 10, wherein location of the measuring points 36 may be changed at any time during a useful life of the blade 10. This positional information pertaining to the first positions 38 of the measuring points 36 may be collected by a user and programmed into the computing resource 32, and/or collected by the measuring device 34 and transmitted to the computing resource 32.

Figure 6:
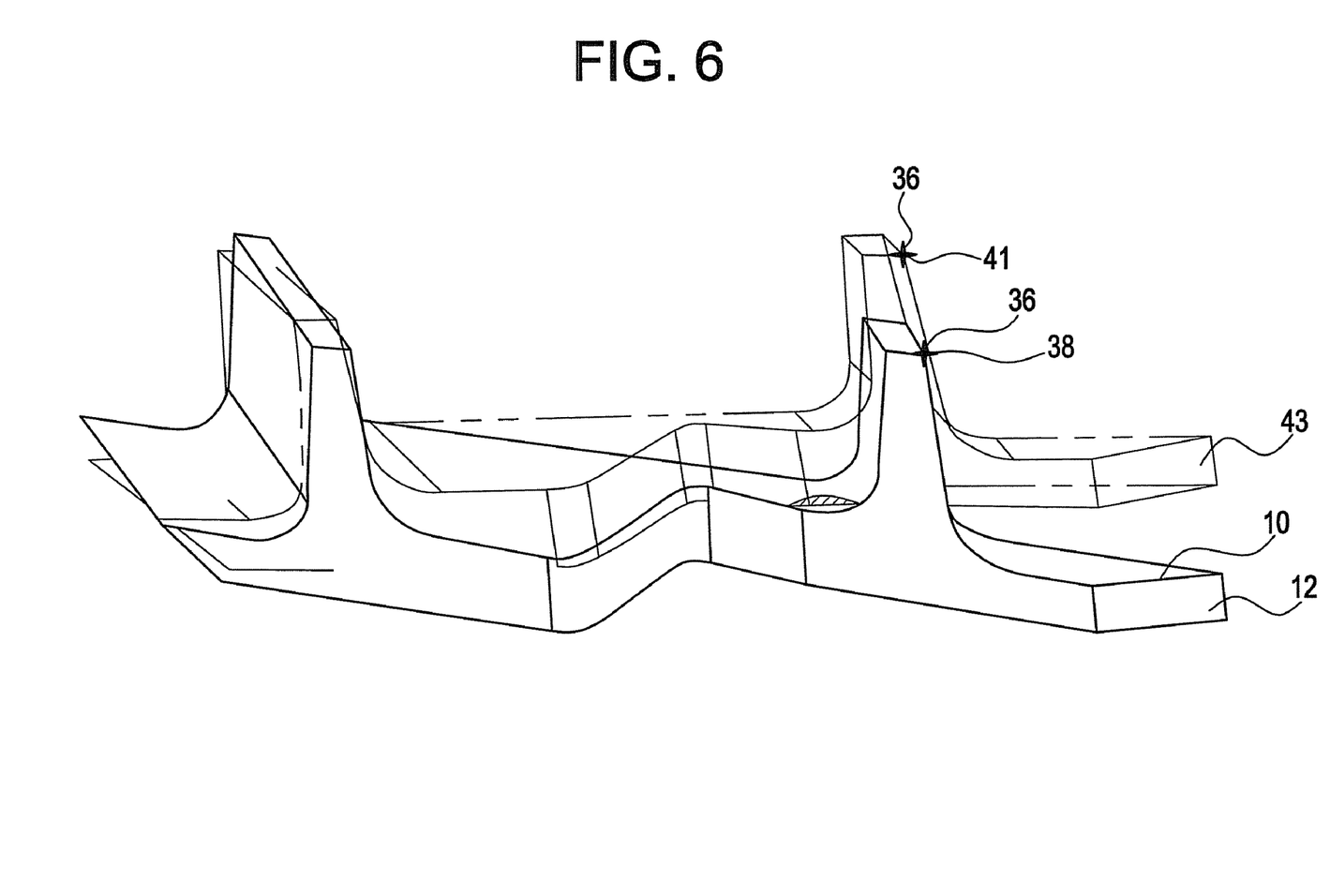
FIG. 6 is a schematic view of the portion of the turbine blade of FIG. 5, FIG. 6 including a partial image of a deformed blade.
Figure 7:
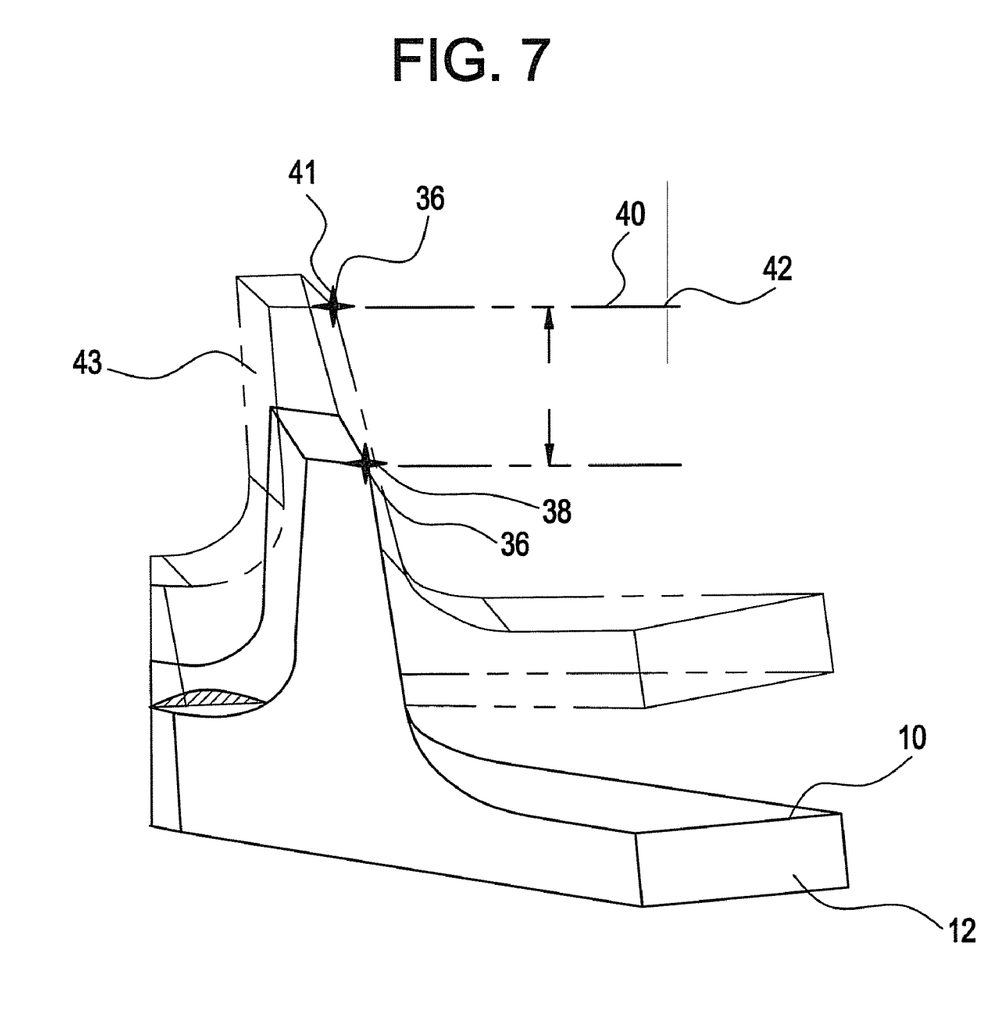
FIG. 7 is a magnified schematic view of the portion of the turbine blade and the partial image of the deformed blade of FIG. 6.

Along with being capable of collecting positional information pertaining to the first positions 38 of the measuring points 36, the measuring device 34 is also configured to measure a spatial distance 40 traveled by the measuring points 36 relative the first positions 38 of the measuring points 36. Movement of the measuring points 36 over the spatial distance 40 occurs in response to normal stresses acting the turbine blade 10 during blade operation over a period of time. This movement creates second positions 41 of the measuring points 36, which are identified after operation of the turbine over the period of time (the first positions being identified prior to operation of the turbine over the period of time). The spatial distance 40, as is best shown in FIGS. 6-7, is measured between the first positions 38 of the measuring points 36 and these second positions 41 of the measuring points 36 (as shown on the deformed blade image 43), with measurement occurring following operation of then turbine over the period of time (i.e. any desired period of time during a useful life of the turbine). Since the measuring points 36 remain fixed upon the turbine blade 10 throughout operation of the blade 10, the distance 40 between the first positions 38 and second positions 41 effectively represent a deforming of the blade 10 in the area of the position changing measuring points 36. As such, the distance 40 represents a deformation 42 of the blade 10.

Figure 8:
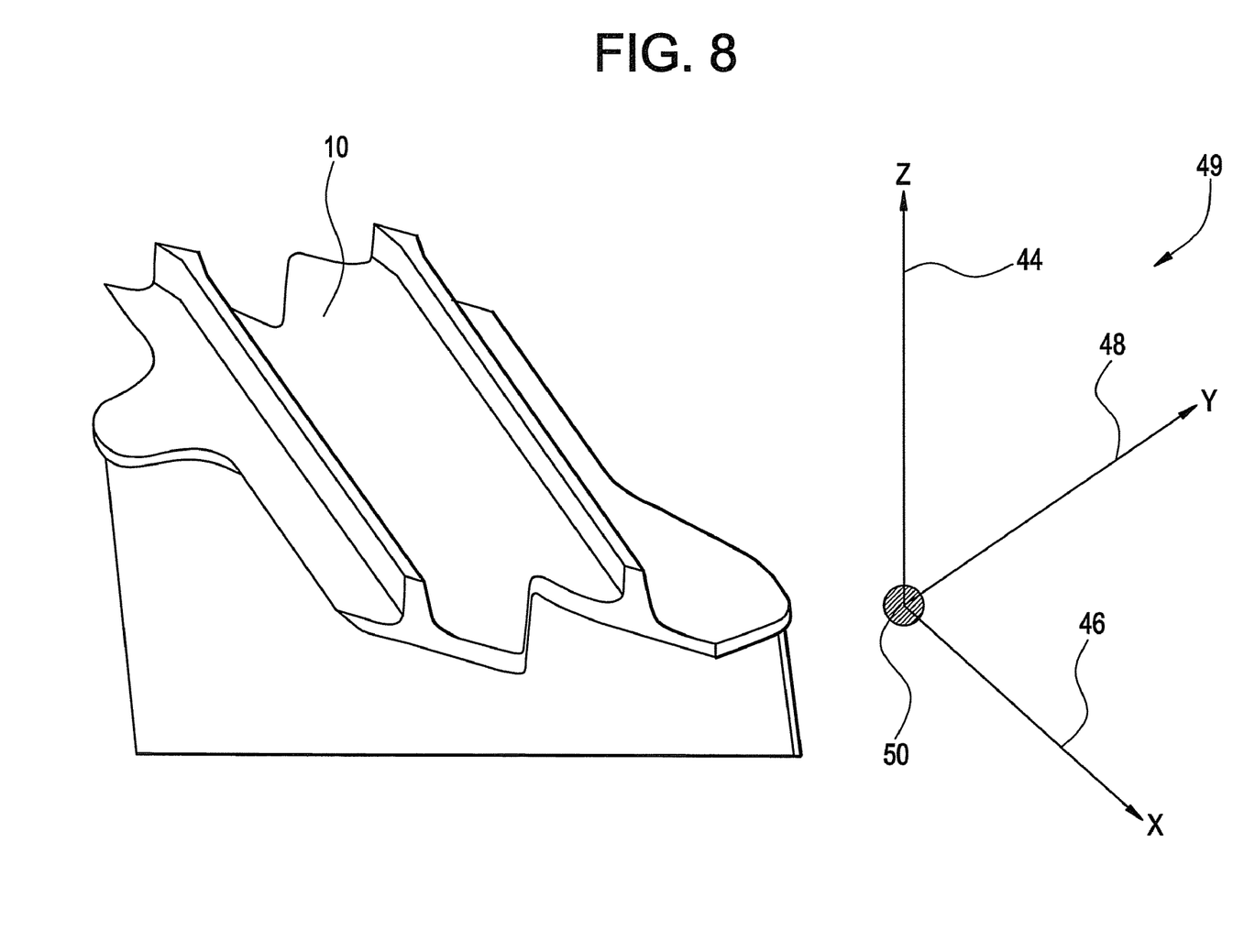
FIG. 8 is a schematic view of the portion of the turbine blade of FIG. 5, FIG. 8 including direction of movement.

Referring to FIG. 8, there is illustrated a coordinate measurement system 49 that includes a zero position 50. Using this coordinate measurement system 49, deformation 42 of the blade 10 may be measured relative to the zero position 50 in at least one of a radial direction 44, axial direction 46, and tangential direction 48 relative to a turbine (not illustrated) to which the turbine blade 10 is affixed. As is shown in FIG. 7, radial, axial, and tangential deformation may be measured based on the distance 40 traveled by the measuring points 36 in each direction 44-48. In addition, a total amount of the deformation 42 of the blade 10 may be measured by assigning the distance 40 traveled in the radial direction 44 a value of z, the distance 40 traveled in the axial direction 46 a value of x, and the distance 40 traveled in the tangential direction 48 a value of y, and plugging these values x, y, and z into an equation where the total deformation is equal to:

$$\sqrt{x^2+y^2+z^2}.$$

Figure 9:
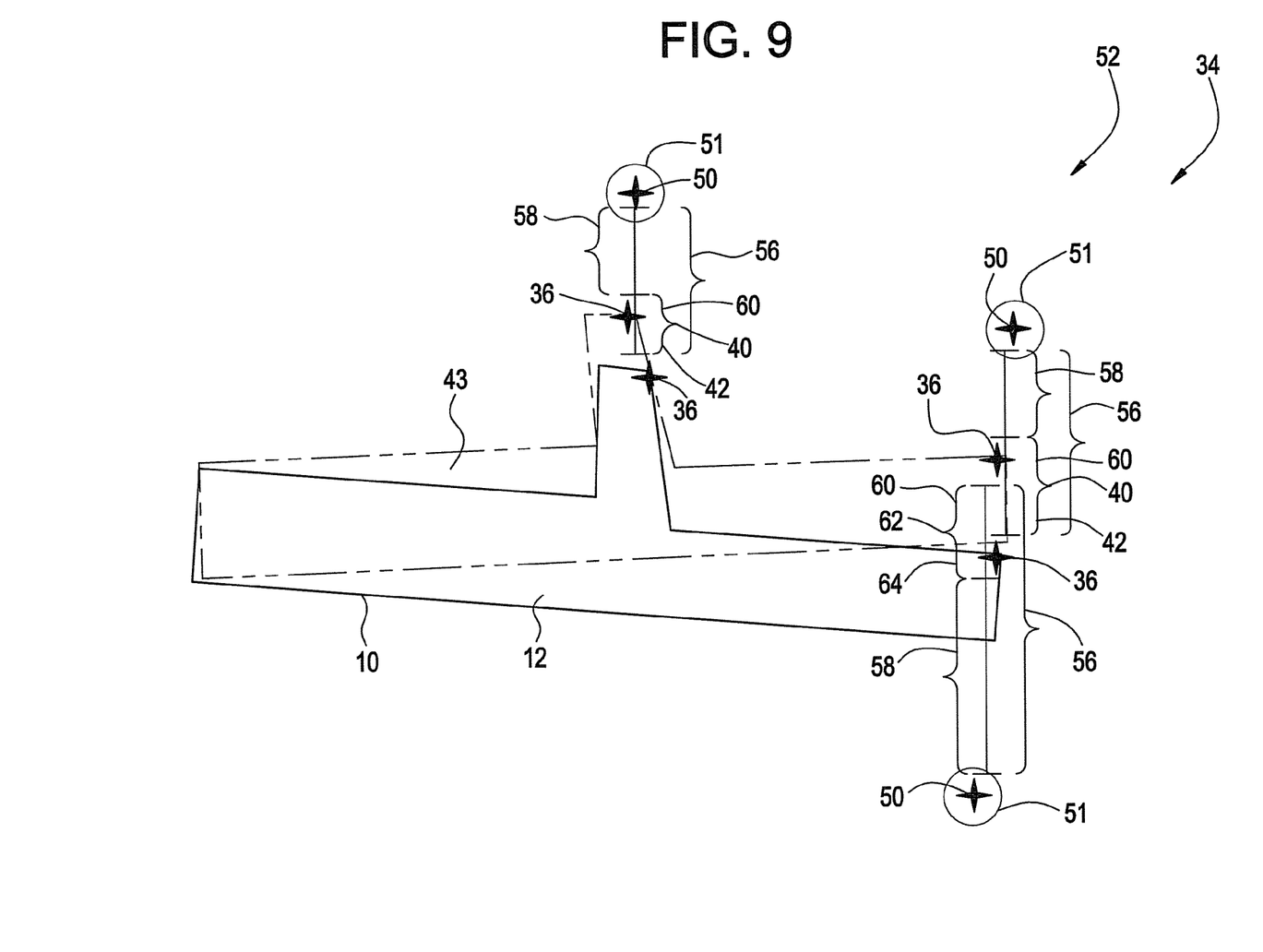
FIG. 9 is a partial schematic view of a turbine blade including a partial image of a deformed blade.

Referring now to FIG. 9, the computing resource 32 and measurement device 34 of the system 20 (as illustrated in the exemplary embodiment of FIG. 4) may be configured to measure deformation 42 of the turbine 10 using fixed locations 51 in a space 52 around the turbine blade 10 (such as the space within the measurement device 34). These locations 51 may be disposed anywhere in the space around the blade 10, such as at the dovetail 18 (see FIG. 1) of the turbine blade 10 (the dovetail 53 showing very little to no deformation following blade usage), within the measuring device 34 (see FIG. 4), or at other components of the turbine to which the turbine blade 10 is affixed. In addition, the zero positions 50 of coordinate measurement systems 49 may be disposed at these locations 51, so as to measure the spatial distance 40 traveled by the measuring points 36 relative to the zero position 50 of a coordinate system 49 disposed at a fixed location 51. In order to measure deformity 42 using the zero positions 50 of the fixed locations 51, the computing resource 32 retains information pertaining to a starting distance 56 between the measuring points 36 and the zero positions 50. This information pertaining to the starting distance 56 between the measuring points 36 and the zero positions 50 may be collected by a user and programmed into the computing resource 32, or collected by the measuring device 34 and transmitted to the computing resource 32.

Along with being capable of collecting information pertaining to the starting distance 56, the measuring device 34 is also configured to measure a second distances 58 between the measuring points 36 and the zero positions 50. These second distances 58 are measured between the measuring points 36 and zero positions 50 after the turbine blade 10 has been normally operated over a period of time (see the deformed blade image 43). The computing resource 32 may then calculate a difference 60 in length between the starting distance 56 (measured prior to operation over the period of time) and second distance 58 (measured after operation over the period of time) in order to determine the distance 40 traveled by the measuring points 36 relative to the zero positions 50. The distance 40 is equal to the difference 60. Since the zero positions 50/fixed locations 51 remain fixed relative to movement of the measuring points 36 and the turbine 10, the distance 40 effectively represents the deforming 42 of the blade 10 in the area of the position changing measuring points 36. Of course, the deformation 42 may be measured in at least one of a radial direction 44, axial direction 46, and tangential direction 48 (relative to the turbine to which the blade 10 is associated) of the coordinate system 49 shown in FIG. 8.

It should be appreciated that the system 20, as used to measure deformation 42, may include a measurement device 34 that is a contact measurement device, such as a coordinate measurement machine, or non-contact measurement device, such as an optical measurement device. It should also be appreciated that a remaining useful life of the turbine blade 10 may be predicted based upon the amount of deformation 42 measured in the turbine blade 10. Blade replacement strategies may then be created and implemented based on the remaining useful life of the blade 10.

Figure 10:
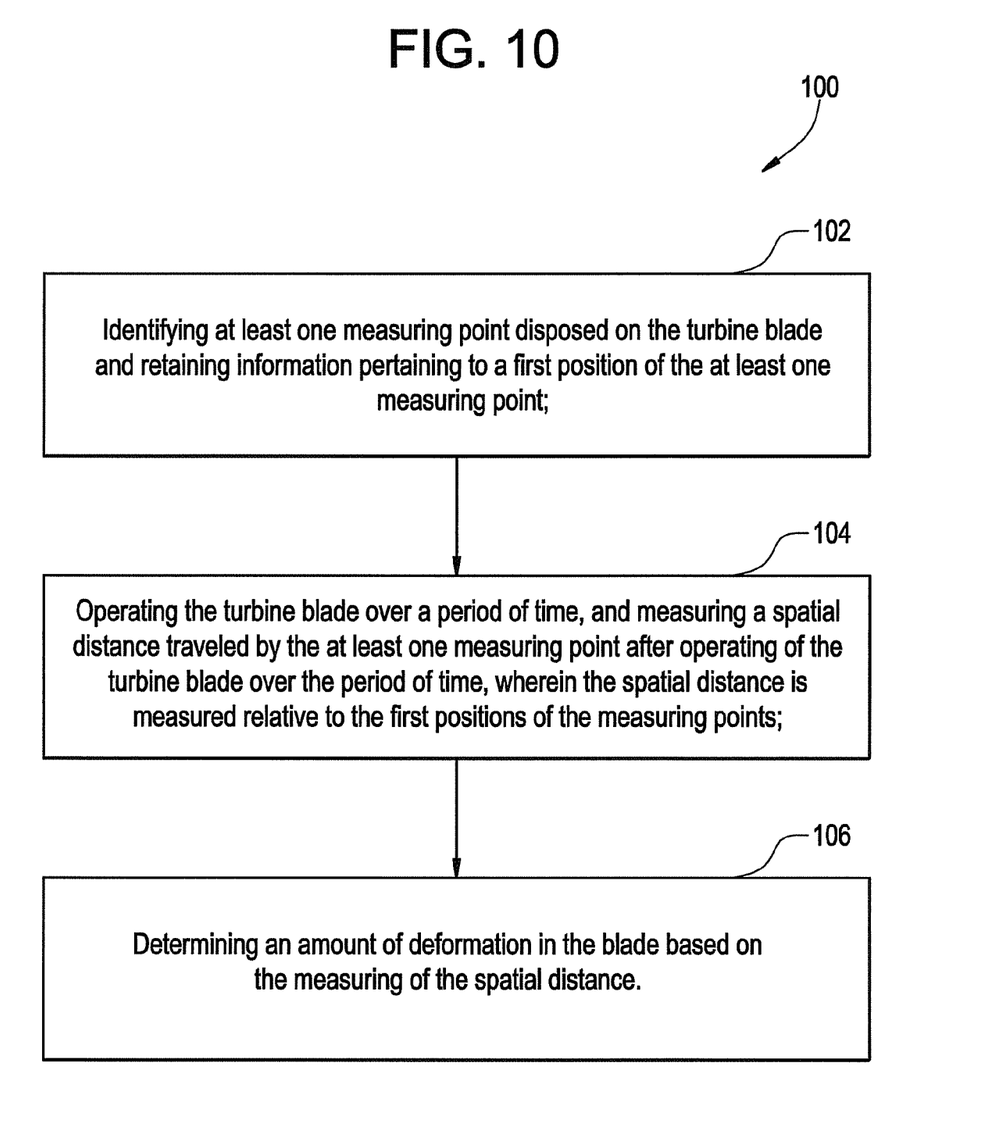
FIG. 10 is a block diagram illustrating an embodiment of a method for measuring deformation of a turbine blade.

Referring to FIG. 10, an exemplary method 100 for measuring deformation of a turbine blade 10 is illustrated. The method 100 includes identifying at least one measuring point 36 disposed on the turbine blade 10 and retaining information pertaining to a first position 38 of the at least one measuring point 36, as shown in operational block 102. The method 100 also includes operating the turbine blade 10 over a period of time, and measuring a spatial distance 40 traveled by the at least one measuring point 36 after operating of the turbine blade 10 over the period of time, wherein the spatial distance 40 is measured relative to the first positions 38 of the measuring points 36, as shown in operational block 104. The method further includes determining an amount of deformation 42 in the blade 10 based on the measuring of the spatial distance 40, as shown in operational block 106.

It will be noted that while the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, it will be further noted that unless specifically stated any use of the terms first, second, etc. do not denote any order or importance, but rather the terms first, second, etc. are used to distinguish one element from another.

What is claimed is:

1. A method for measuring deformation of a turbine blade, the method comprising:

identifying at least one measuring point disposed on the turbine blade prior to occurrence of deformation or cracking at said at least one measuring point;

retaining information pertaining to a first position of said at least one measuring point;

operating the turbine blade over a period of time;

measuring a spatial distance traveled by said at least one measuring point after said operating of the turbine blade over said period of time, said spatial distance being measured relative to said first position of said at least one measuring point; and determining an amount of deformation in the blade based on said measuring of said spatial distance.

2. The method of claim 1, wherein said spatial distance traveled is measured in at least one of a radial direction, an axial direction, and a tangential direction relative to a turbine to which the turbine blade is affixed.

3. The method of claim 2, wherein said determining includes determining radial deformation based on said spatial distance traveled in said radial direction, determining axial deformation based on said spatial distance traveled in said axial direction, and determining tangential deformation based on said spatial distance traveled in said tangential direction.

4. The method of claim 1, wherein said spatial distance traveled is measured in a radial direction, an axial direction, and a tangential direction relative to disposition of the turbine blade in a turbine, and said deformation is determined via an equation wherein said spatial distance traveled in said radial direction is represented by z, said spatial distance traveled in said axial direction is represented by x, and said spatial distance traveled in said axial direction is represented by y, said equation calculating said deformation via $\sqrt{x^2+y^2+z^2}$.

5. The method of claim 1, wherein at least one of said identifying and said measuring is accomplished via a contact measurement device or non-contact measurement device.

6. The method of claim 1, wherein at least one of said identifying and said measuring is accomplished via a coordinate measurement machine or optical measurement device.

7. The method of claim 1, wherein at least one of said at least one measuring points are disposed on rails or cutter teeth of the turbine blade.

8. The method of claim 1, further including predicting a remaining life of the turbine blade based on said determining.

9. The method of claim 1, further including identifying at least one zero position of a coordinate system, said spatial distance traveled by said at least one measuring point being measured relative to said zero position of said coordinate system.

10. The method according to claim 9, wherein said zero position of said coordinate system is disposed in a location in space around the turbine blade, said location being disposed within a coordinate measurement machine or optical measurement device used to measure said deformation of the turbine blade.

11. The method according to claim 9, wherein said zero position of said coordinate system is in a space around the turbine blade, said zero point being disposed upon a dovetail section of the turbine blade.

12. The method according to claim 9, wherein said zero position of said coordinate system is in a space around the turbine blade, said zero point being disposed upon a turbine part of a turbine with which the turbine blade is associated.

13. A system for measuring deformation of a turbine blade, the system comprising:
 a computing resource configured to retain positional information pertaining to a first position of at least one measuring point disposed on the turbine blade said positional information being retained prior to occurrence of deformation or cracking at said at least one measuring point; and
 a measurement device associated with said computing resource, said measurement device being configured to measure a distance traveled by said at least one measuring point relative to said first position.

14. A system according to claim 13, wherein said measurement device is a contact measurement device or non-contact measurement device.

15. A system according to claim 13, wherein said measurement device is a coordinate measurement machine or optical measurement device.

16. A system of claim 13, wherein said computing resource is further configured to retain positional information pertaining to at least one zero position of a coordinate system, said zero position being disposed on a location in a space around the turbine blade, and said positional information being retained relative to said first position of said at least one measuring point, and wherein said measurement device if further configured to measure a distance traveled by said at least one measurement point relative to said zero position.

* * * * *